United States Patent
Jiang et al.

(10) Patent No.: US 12,159,438 B2
(45) Date of Patent: Dec. 3, 2024

(54) SUBSTITUTIONAL INPUT OPTIMIZATION FOR ADAPTIVE NEURAL IMAGE COMPRESSION WITH SMOOTH QUALITY CONTROL

(71) Applicant: TENCENT AMERICA LLC, Palo Alto, CA (US)

(72) Inventors: Wei Jiang, Sunnyvale, CA (US); Wei Wang, Palo Alto, CA (US); Xiaozhong Xu, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 331 days.

(21) Appl. No.: 17/702,177

(22) Filed: Mar. 23, 2022

(65) Prior Publication Data
US 2022/0335655 A1  Oct. 20, 2022

Related U.S. Application Data

(60) Provisional application No. 63/176,745, filed on Apr. 19, 2021.

(51) Int. Cl.
*G06T 9/00* (2006.01)

(52) U.S. Cl.
CPC .............. *G06T 9/002* (2013.01); *G06T 9/001* (2013.01)

(58) Field of Classification Search
CPC ....... G06T 9/001; G06T 9/002; H04N 19/124; H04N 19/147; H04N 19/172
See application file for complete search history.

(56) References Cited

U.S. PATENT DOCUMENTS

| | | | |
|---|---|---|---|
| 2008/0037880 A1* | 2/2008 | Lai | H04N 19/64 375/240 |
| 2015/0012712 A1 | 1/2015 | Penner | |
| 2018/0027242 A1* | 1/2018 | Hiwatashi | H04N 19/137 382/103 |

(Continued)

FOREIGN PATENT DOCUMENTS

WO    2020/100435 A1    5/2020

OTHER PUBLICATIONS

International Search Report dated Jul. 1, 2022 in International Application No. PCT/US22/21962.

(Continued)

*Primary Examiner* — Tsung Yin Tsai
(74) *Attorney, Agent, or Firm* — Sughrue Mion, PLLC

(57) ABSTRACT

The present disclosure includes a method, apparatus, and non-transitory computer-readable medium for adaptive neural image compression by meta-learning. The method may include generating a substitute input image and a substitute target quality control parameter using an original input image and a target quality control parameter, wherein the substitute input image is a modified version of the original input image and the substitute target quality control parameter is a modified version of the target quality control parameter. The method may further include encoding the substitute input image, based on the substitute input image and the substitute target quality control parameter, using an encoding neural network, to generate a compressed representation of the substitute input image.

17 Claims, 10 Drawing Sheets

(56) References Cited

U.S. PATENT DOCUMENTS

| | | | |
|---|---|---|---|
| 2018/0136899 A1* | 5/2018 | Risberg | G06F 3/165 |
| 2019/0130214 A1 | 5/2019 | N et al. | |
| 2020/0186809 A1* | 6/2020 | Mukherjee | H04N 19/176 |
| 2021/0266565 A1* | 8/2021 | Zhou | H04N 19/124 |
| 2022/0005233 A1 | 1/2022 | Kudo et al. | |
| 2022/0103839 A1* | 3/2022 | Van Rozendaal | H04N 19/147 |
| 2022/0385907 A1* | 12/2022 | Zhang | H04N 19/103 |
| 2023/0074979 A1* | 3/2023 | Brehmer | G06F 18/211 |

OTHER PUBLICATIONS

Written Opinion of the International Searching Authority dated Jul. 1, 2022 in International Application No. PCT/US22/21962.

Wei Jiang et al., "Online Meta Adaptation for Variable-Rate Learned Image Compression", arXiv:2111.08256v1, 2021 (9 pages total).

Yuyang Xue et al., "Attention Based Image Compression Post-Processing Convolutional Neural Network", CVPR Workshops, 2019 (4 pages total).

Honggang Chen et al., "Adaptive image coding efficiency enhancement using deep convolutional neural networks", Information Sciences, 2020, vol. 524, pp. 298-317 (20 pages total).

Chelsea Finn et al., "Model-Agnostic Meta-Learning for Fast Adaptation of Deep Networks", PMLR, 2017 (10 pages total).

Extended European Search Report issued Jun. 19, 2023 in European Application No. 22760640.7.

Wei Wang et al., "Substitutional Neural Image Compression", International Organisation for Standardisation Organisation Internationale De Normalisation ISO/IEC JTC1/SC29/WG11 Coding of Moving Pictures and Audio, ISO/IEC JTC1/SC29/WG11 MPEG2020/M54739, Jun. 2020, Virtual Meeting (7 pages total).

Wei Wang et al., "M53379 Substitutional Neural Image Compression", Tencent, 2020 (9 pages total).

Timothy Hospedales et al., "Meta-Learning in Neural Networks: A Survey", https://arxiv.org/abs/2004.05439, Nov. 7, 2020. pp. 1-20 (20 pages total).

Fei Yang et al., "Variable Rate Deep Image Compression With Modulated Autoencoder", IEEE Signal Processing Letters, 2020, vol. 27, pp. 331-335 (6 pages total).

Communication dated Nov. 20, 2023, issued in Japanese Application No. 2022-564456.

* cited by examiner

SUBSTITUTIONAL INPUT OPTIMIZATION FOR ADAPTIVE NEURAL IMAGE COMPRESSION WITH SMOOTH QUALITY CONTROL

CROSS-REFERENCE TO RELATED APPLICATION(S)

This application is based on and claims priority to U.S. Provisional Patent Application No. 63/176,745, filed on Apr. 19, 2021, the disclosure of which is incorporated by reference herein in its entirety.

BACKGROUND

ISO/IEC MPEG (JTC 1/SC 29/WG 11) has been actively searching for potential needs for standardization of future video coding technology. ISO/IEC JPEG has established the JPEG-AI group focusing on AI-based end-to-end Neural Image Compression (NIC) using Neural Networks (NN). The success of recent approaches has brought more and more industrial interests in advanced neural image and video compression methodologies.

Although some approaches have shown promising performance, flexible bitrate control remains a challenging issue for previous NIC methods. For example, some approaches may require training multiple model instances targeting each desired trade-off between a rate and a distortion (a quality of compressed images) individually. All these multiple model instances may be stored and deployed on a decoder side to reconstruct images from different bitrates. Also, these model instances cannot give arbitrary smooth bitrate control, because it is difficult to train and store an infinite number of model instances for every possible target bitrate. Some approaches have studied multi-rate NIC in which one model instance is trained to achieve compression of multiple pre-defined bitrates. However, arbitrary smooth bitrate control remains an unexplored open issue.

Additionally, flexible target quality metric control is difficult for previous NIC methods, since it requires training an individual model instance for each target quality metric (e.g., peak signal-to-noise ratio (PSNR), a structural similarity index measure (SSIM), a combination of PSNR and SSIM, and so on). Smooth quality metric control (e.g., a weighted combination of PSNR and SSIM with arbitrary importance weights) remains an open issue.

SUMMARY

According to embodiments of the present disclosure, a method of adaptive neural image compression by meta-learning is performed, the method being performed by at least one processor, and the method includes generating a substitute input image and a substitute target quality control parameter using an original input image and a target quality control parameter, wherein the substitute input image is a modified version of the original input image and the substitute target quality control parameter is a modified version of the target quality control parameter. The method further include encoding the substitute input image, based on the substitute input image and the substitute target quality control parameter, using an encoding neural network, to generate a compressed representation of the substitute input image. In some embodiments, the method further includes generating a compressed bitstream based on the compressed representation of the substitute input image using quantization and entropy encoding. The method may also include receiving a recovered compressed bitstream and the substitute target quality control parameter, then generating a recovered compressed representation, based on the recovered compressed bitstream and the received substitute target quality control parameter using dequantization and entropy decoding, and decoding the generated recovered compressed representation based on the received substitute target quality control parameter using a decoding neural network to reconstruct an output image.

According to embodiments of the present disclosure, an apparatus for adaptive neural image compression by meta-learning includes at least one memory configured to store computer program code; and at least one processor configured to access the computer program code and operate as instructed by the computer program code. The program code includes first generating code configured to cause the at least one processor to generate a substitute input image and a substitute target quality control parameter using an original input image and a target quality control parameter, wherein the substitute input image is a modified version of the original input image and the substitute target quality control parameter is a modified version of the target quality control parameter; and encoding code configured to cause the at least one processor to encode the substitute input image, based on the substitute input image and the substitute target quality control parameter, using an encoding neural network, to generate a compressed representation of the substitute input image.

According to embodiments of the present disclosure, a non-transitory computer readable medium storing a storing instructions includes instructions that, when executed by one or more processors of a device for adaptive neural image compression by meta-learning, cause the one or more processors to generate a substitute input image and a substitute target quality control parameter using an original input image and a target quality control parameter, wherein the substitute input image is a modified version of the original input image and the substitute target quality control parameter is a modified version of the target quality control parameter; and encode the substitute input image, based on the substitute input image and the substitute target quality control parameter, using an encoding neural network, to generate a compressed representation of the substitute input image.

DETAILED DESCRIPTION

The present disclosure describes methods and apparatuses for finding and/or generating a substitutional input image and a substitutional target quality control parameter for each image adaptively to generate an optimal substitute input image and an optimal substitute quality control parameter in a Meta Neural Image Compression (Meta-NIC) framework.

The Meta-NIC system may adaptively compute the quality-adaptive weight parameters of the underlying Neural Image Compression (NIC) model based on the current substitutional input image and the target compression quality, so that a single Meta-NIC model instance may achieve image compression with arbitrary smooth target quality control, including smooth bitrate control, smooth quality metric control, etc.

The generated substitutional input image used in the Meta-NIC system is a superior alteration of the original input image, enabling better compression. In addition, the generated substitutional target quality control parameter improves the computed quality-adaptive weight parameters to better compress the generated substitutional input image for the target compression quality. The decoder uses the learned substitutional target quality parameter to reconstruct the original input image from the encoded bitstream.

Figure 1:
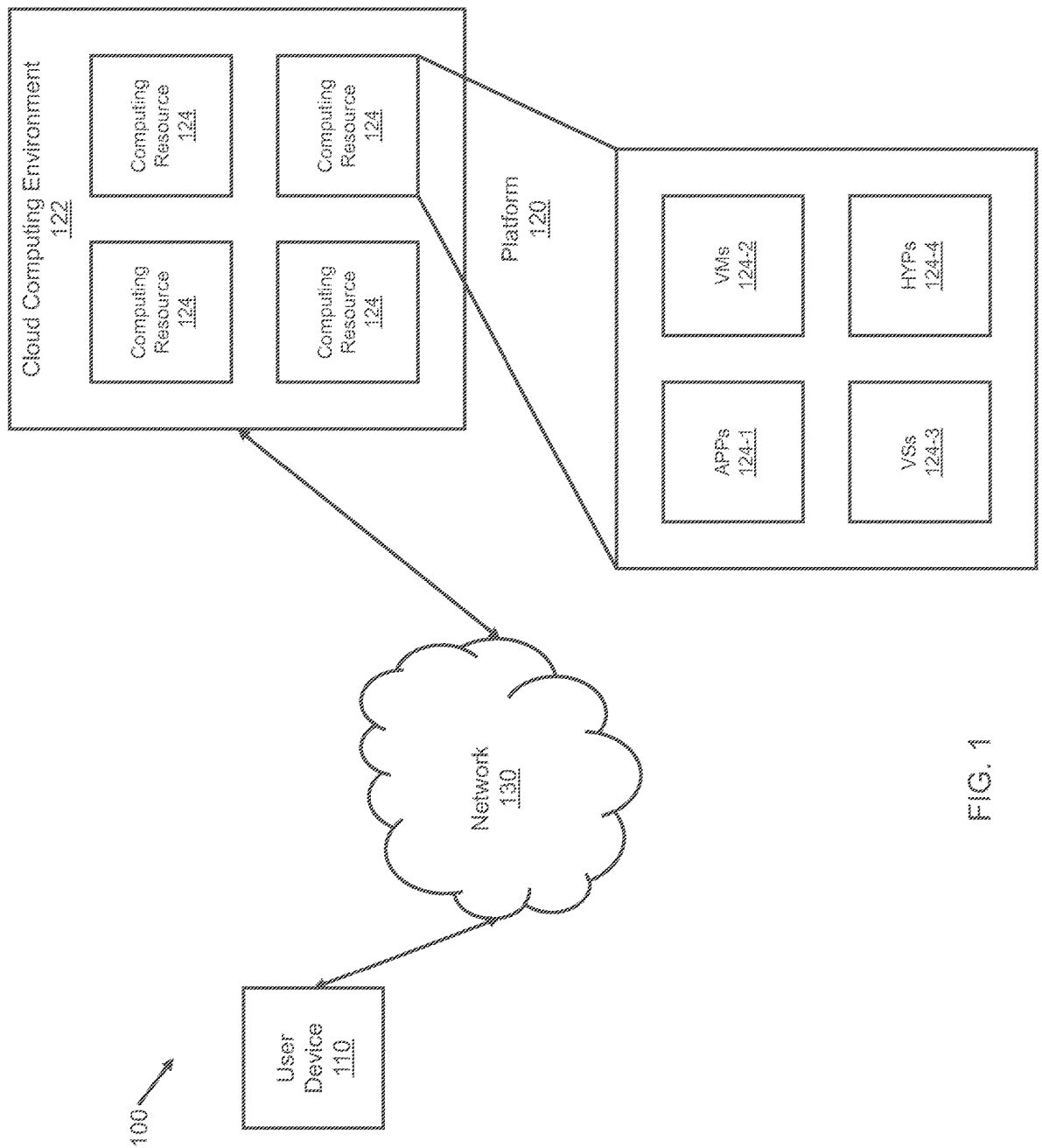
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
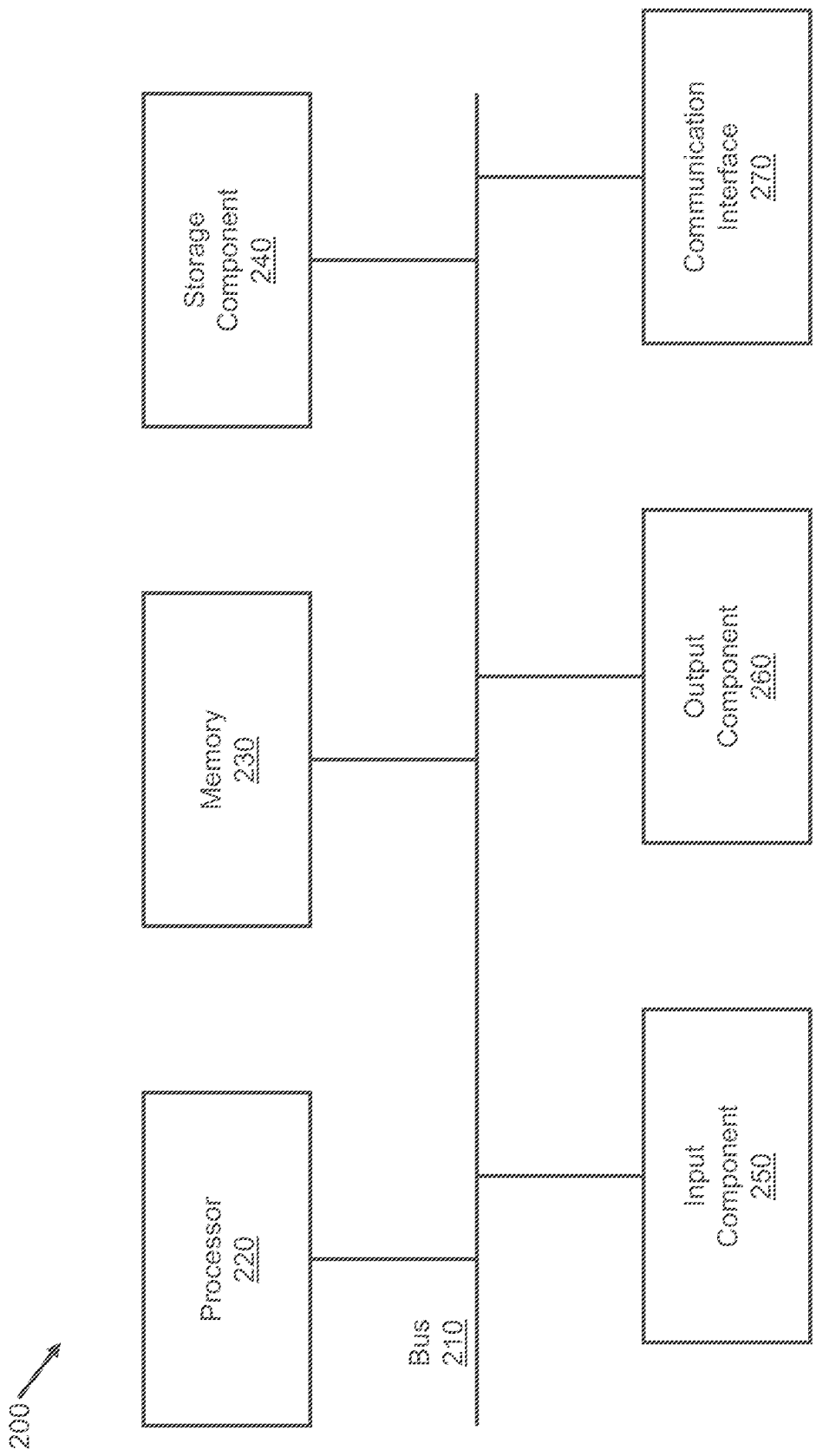
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for adaptive neural image compression with smooth quality control by meta-learning will now be described in detail.

Embodiments of the present disclosure describe methods and apparatuses for a substitutional Meta-NIC framework that, on one hand, supports arbitrary smooth quality control (including bitrate control, quality metric control, etc., and at the same time, finds an optimal substitute input image and an optimal substitute quality control parameter for each input image adaptively.

The Meta-NIC system may adaptively compute the quality-adaptive weight parameters of the underlying NIC model based on the current substitutional input image and the target compression quality, so that a single Meta-NIC model instance may achieve image compression with arbitrary smooth target quality control, including smooth bitrate control, smooth quality metric control, etc.

Given an input image x of size (h,w,c), where h, w, c are a height, a width, and a number of channels, respectively, an NIC workflow can be described as follows. The input image x may be a regular image frame (t=1), a 4-dimensional video sequence comprising more than one image frame (t>1), and so on. Each image frame may be a color image (c=3), a gray-scale image (c=1), an rgb+depth image (c=4), etc. A compressed representation $\bar{y}$ that is compact for storage and transmission is computed. Then, based on the compressed representation $\bar{y}$, an output image $\bar{x}$ is reconstructed, and the reconstructed output image $\bar{x}$ may be similar to the original input image x. A distortion loss D (x, $\bar{x}$) is used to measure a reconstruction error, such as a peak signal-to-noise ratio (PSNR) or a structural similarity index measure (SSIM). A rate loss R($\bar{y}$) is computed to measure a bit consumption of the compressed representation $\bar{y}$. A trade-off hyperparameter λ is used to form a joint Rate-Distortion (R-D) loss:

$$L(x,\bar{x},\bar{y}) = \lambda D(x,\bar{x}) + R(\bar{y}) \tag{1}$$

Training with a large hyperparameter X results in compression models with smaller distortion but more bit consumption, and vice versa. Traditionally, for each pre-defined hyperparameter λ, an NIC model instance will be trained, which will not work well for other values of the hyperparameter λ. Therefore, to achieve multiple bitrates of a compressed stream, traditional methods may require training and storing multiple model instances. Also, because it is difficult to train a model for every possible value of the hyperparameter λ in practice, traditional methods cannot achieve arbitrary smooth quality control such as smooth bitrate control. Similarly, traditional methods may require training and storing multiple model instances for each distortion metric or other metrics, which may make it difficult to achieve smooth quality metric control.

Figure 3A:
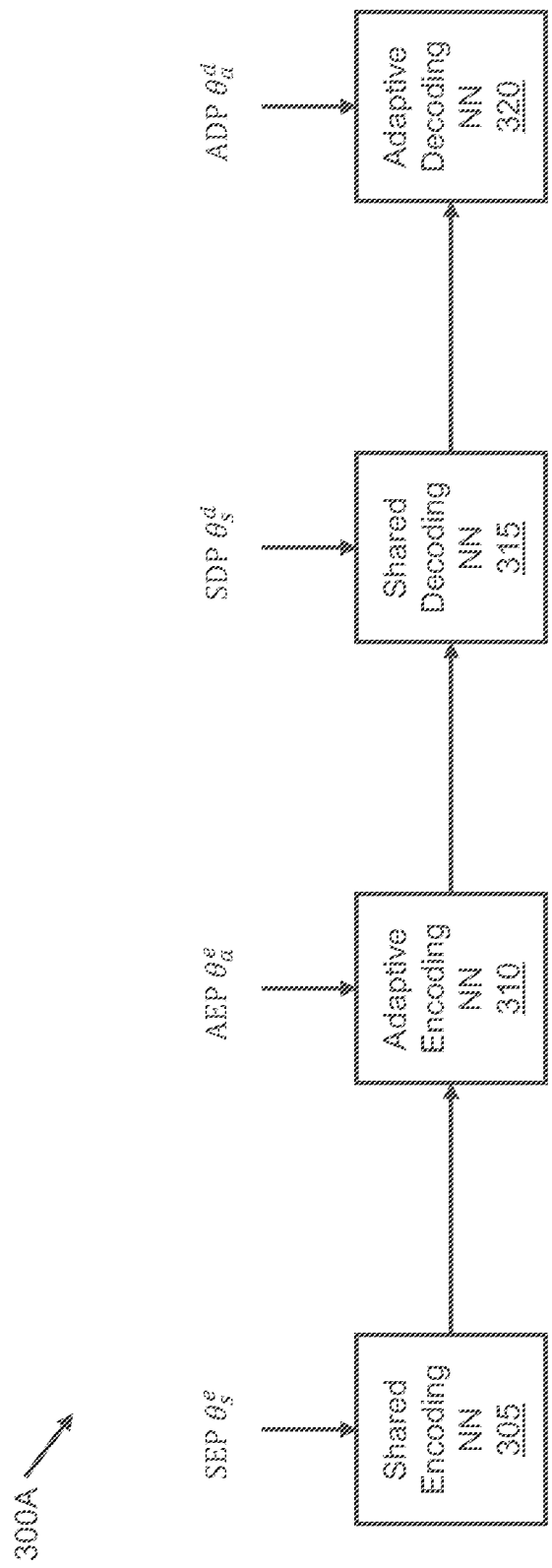
FIGS. 3A and 3B are block diagrams of meta-NIC architectures for adaptive neural image compression with smooth quality control, according to embodiments.
Figure 3B:
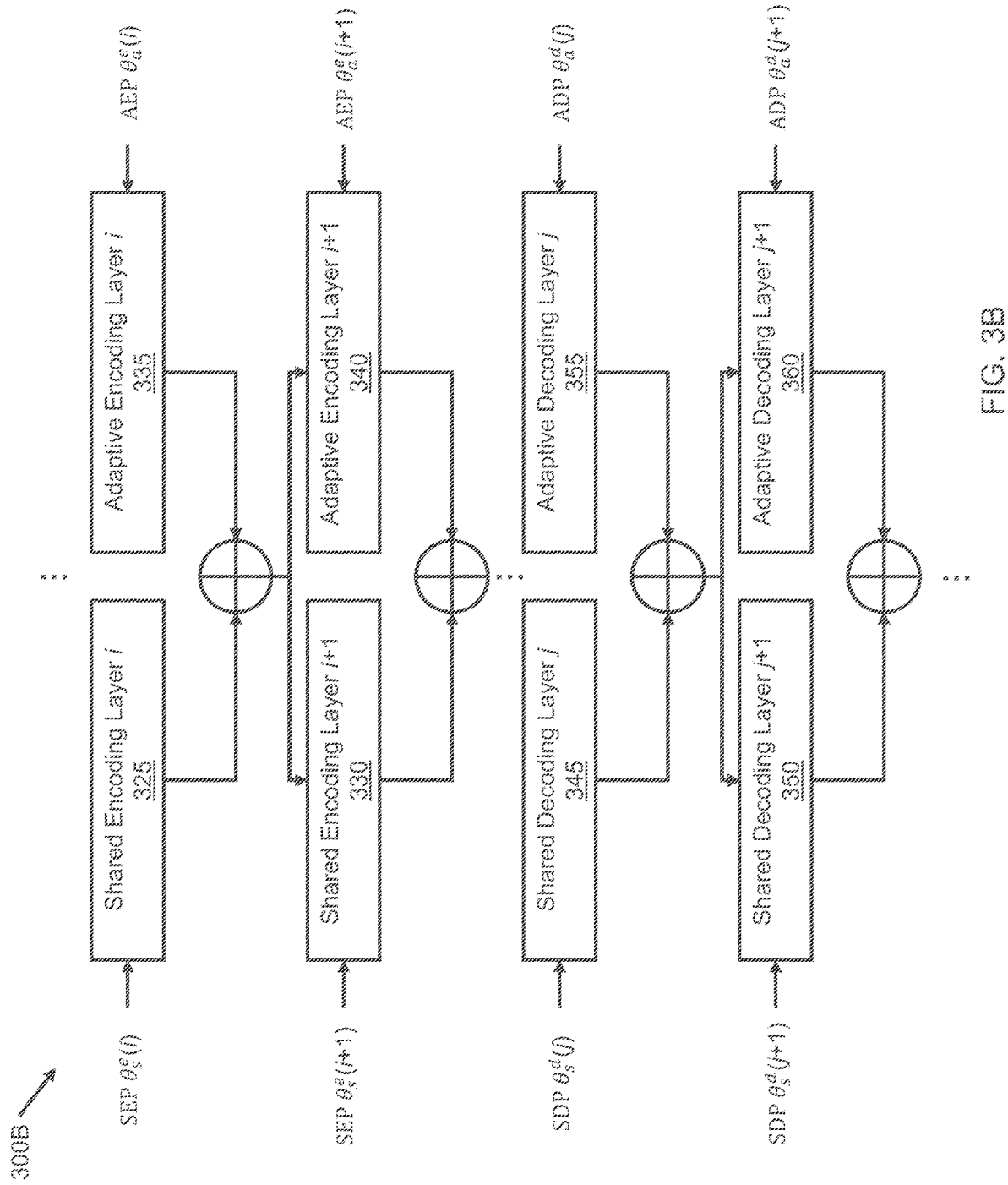

FIGS. 3A and 3B are block diagrams of meta-NIC architectures 300A and 300B for adaptive neural image compression with rate control by meta-learning, according to embodiments.

As shown in FIG. 3A, the meta-NIC architecture 300A may include a shared encoding NN 305, an adaptive encoding NN 310, a shared decoding NN 315 and an adaptive decoding NN 320.

As shown in FIG. 3B, the meta-NIC architecture 300B may include shared encoding layers 325 and 330, adaptive encoding layers 335 and 340, shared decoding layers 345 and 350 and adaptive decoding layers 355 and 360.

In embodiments of the present disclosure, model parameters of an underlying NIC encoder and an underlying NIC decoder may be separated into 4 parts $\theta_s^e$, $\theta_a^e$, $\theta_s^d$, $\theta_a^d$, denoting Shared Encoding Parameters (SEP), Adaptive Encoding Parameters (AEP), Shared Decoding Parameters (SDP), and Adaptive Decoding Parameters (ADP), respectively. FIGS. 3A and 3B show two embodiments of an NIC network architecture.

In FIG. 3A, SEP, SDP, AEP and ADP are separated individual NN modules, and these individual modules are connected to each other sequentially for network forward computation. Here, FIG. 3A shows a sequential order of connecting these individual NN modules. Other orders may be used here.

In FIG. 3B, a parameter split may take place within NN layers. Let $\theta_s^e(i)$, $\theta_a^e(i)$, $\theta_s^d(j)$, $\theta_a^d(j)$ denote SEP, AEP, SDP, and ADP for an i-th layer of an NIC encoder and a j-th layer of an NIC decoder, respectively. The NIC may compute inference outputs based on corresponding inputs for the SEP and AEP (or the SDP and ADP), respectively, and these outputs may be combined (e.g., by addition, concatenation, multiplication, etc.) and then sent to a next layer.

The embodiment of FIG. 3A can be seen as a case of FIG. 3B, in which $\theta_a^e(i)$ may be empty for layers in the shared encoding NN 305, $\theta_s^e(i)$ may be empty for layers in the adaptive encoding NN 310, $\theta_a^d(j)$ may be empty for layers in the shared decoding NN 315, and $\theta_s^d(j)$ may be empty for layers in the adaptive decoding NN 320. Therefore, in other embodiments, the network structures of FIGS. 3A and 3B can be combined, in which an NIC architecture includes both purely shared encoding/decoding layers and/or purely adaptive encoding/decoding layers, and mixed layers with partial shared encoding/decoding parameters and partial adaptive encoding/decoding parameters.

Figure 4A:
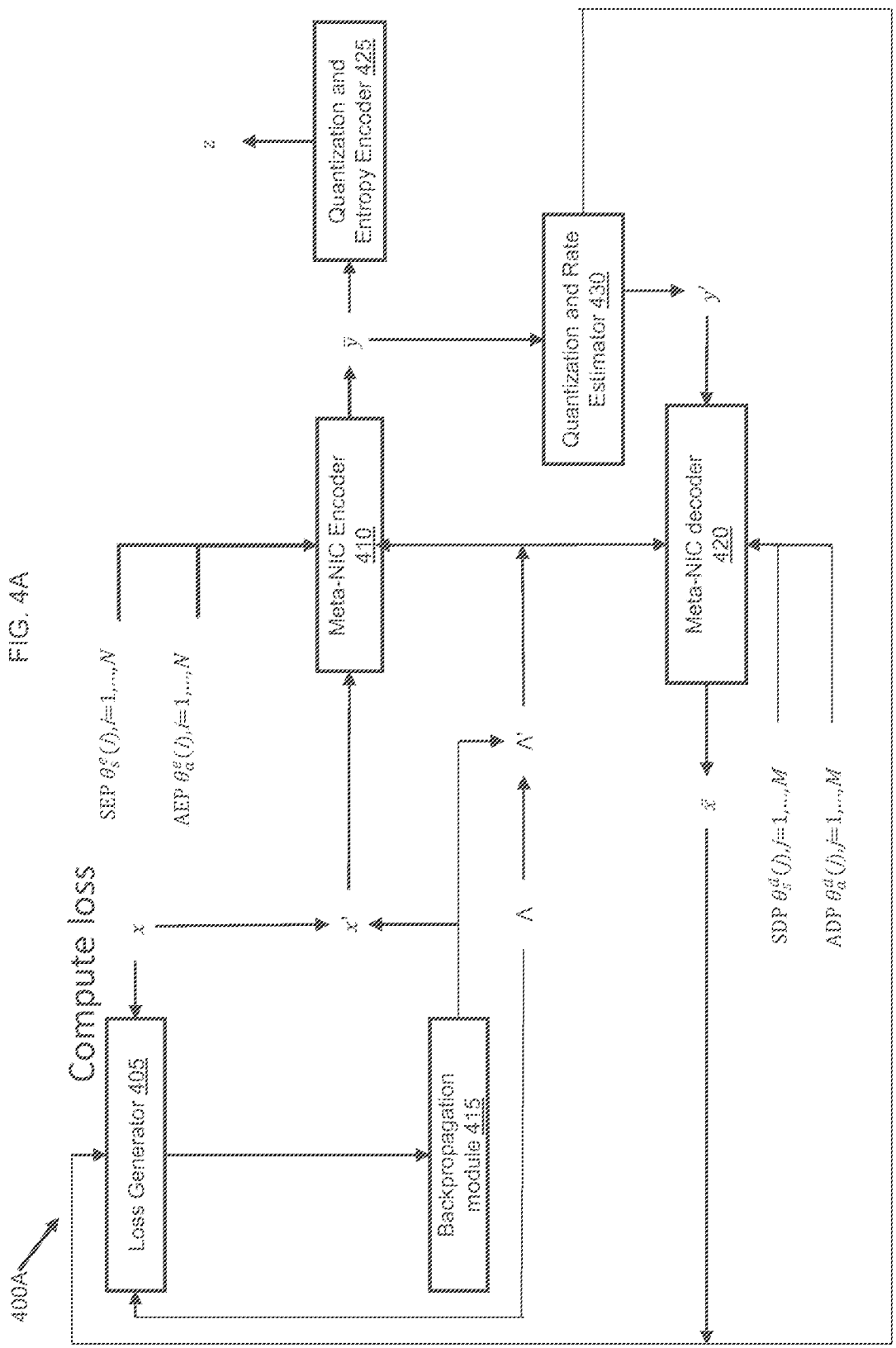
FIG. 4A is a block diagram of an apparatus for adaptive neural image compression with smooth quality control, according to embodiments.

As shown in FIG. 4A, the apparatus 400A includes a meta-NIC encoder 410, a meta-NIC decoder 420, a loss generator 405, a backpropagation generator 415, a quantization and entropy encoder 425, and a quantization and rate estimator 430.

FIG. 4A shows an overall workflow of the test stage of a meta-NIC framework. Let $\theta_s^e(i)$ and $\theta_a^e(i)$ denote SEP and AEP for an i-th layer of the meta-NIC encoder 410, respectively. These are exemplary notations, because, according to some embodiments, for a layer that is completely shared, $\theta_a^e(i)$ is empty. Also, for a layer that is completely adaptive, $\theta_s^e(i)$ is empty. Similarly, Let $\theta_s^d(j)$ and $\theta_a^d(j)$ denote SDP and ADP for an j-th layer of the meta-NIC decoder 420, respectively. These notations are exemplary, because, according to some embodiments, for a layer that is completely shared, $\theta_a^d(j)$ is empty. Also, for a layer that is completely adaptive, $\theta_s^d(j)$ is empty. In some embodiments, these notation may be used for both embodiments of FIGS. 3A and 3B.

Given a substitute input image x', and given a substitute target quality control parameter Λ', the meta-NIC encoder 410 computes a compressed representation $\bar{y}$. In some embodiments, the substitute input image x' may be an altered version of the original input image x. The substitute target quality control parameter Λ' may be an altered version of an original target quality control parameter Λ that indicates the target compression quality, including the target quality metric, the target bitrate, and so on. Both the substitute input image x' and the substitute target quality control parameter Λ' may be obtained through an iterative online learning process based on the original input image x and the original target quality control parameter Λ.

For the target quality control parameter Λ, let q be a number of quality metrics $D_1(x, \bar{x})$, ... $D_q(x, \bar{x})$ (such as PSNR, SSIM, etc.), and the overall quality metric be generally represented as a weighted combination of the number of quality metrics:

$$D(x, \bar{x}) = \sum_{i=1}^{q} w_i D_i(x, \bar{x}) \tag{2}$$

Where weights $w_i \geq 0$. In some embodiments, the target quality control parameter Λ may be a single vector comprising of all the weights $w_i$ and the target trade-off hyperparameter λ: $\Lambda = [w_1, \ldots w_q, \lambda]$. When only a single quality metric $D_1(x, \bar{x})$ is being used, the $w_i = 1$ and $w_j = 0$, for any i≠j.

In embodiments where the above-mentioned is true, $\Lambda$ may be reduced to contain only the target trade-off hyperparameter $\lambda$: $\Lambda=\lambda$.

Figure 4B:
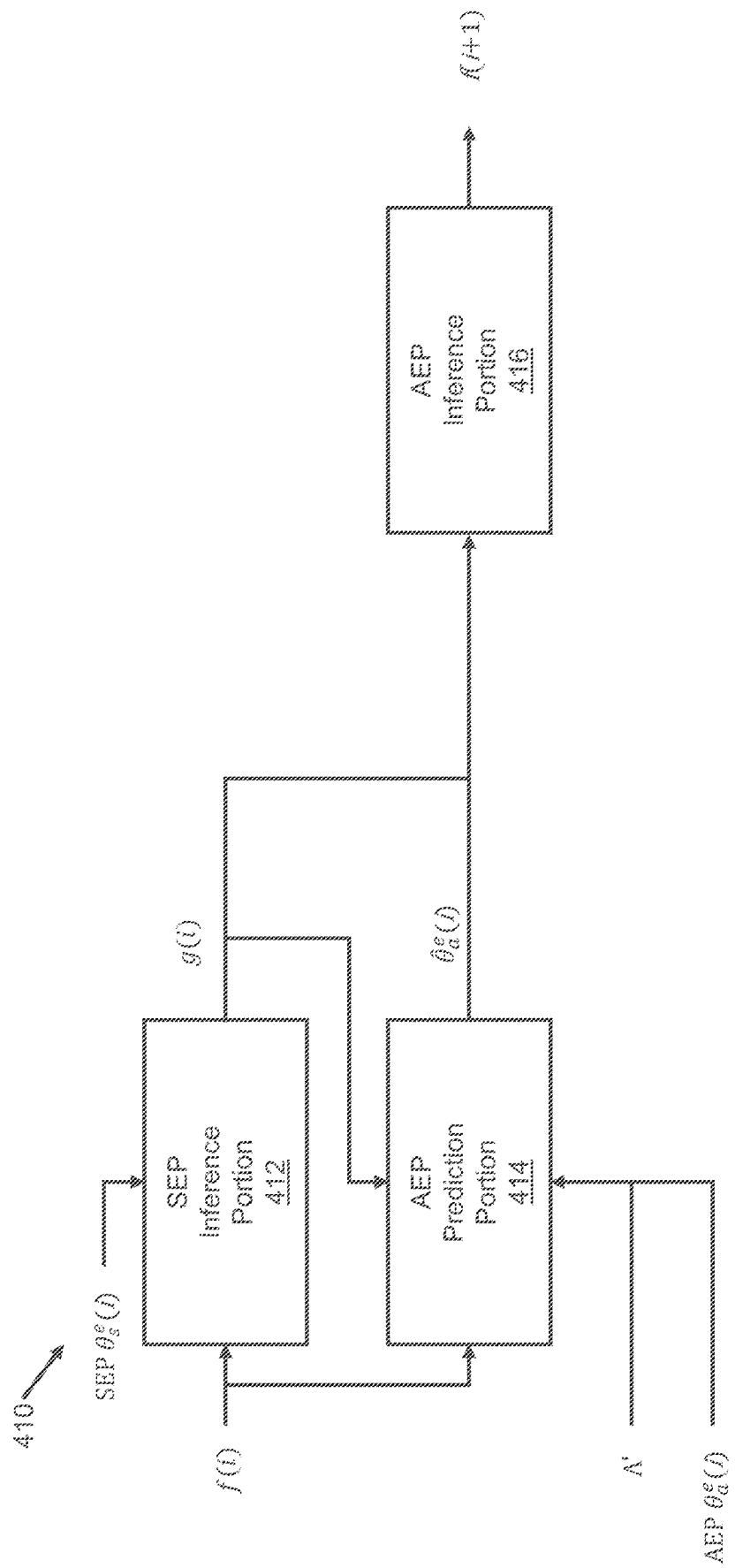
FIG. 4B is a block diagram of a meta-NIC encoder of the apparatus shown in FIG. 4A, according to embodiments.

FIG. 4B is a block diagram of the meta-NIC encoder 410 of the apparatus 400A shown in FIG. 4A.

As shown in FIG. 4B, the meta-NIC encoder 410 includes an SEP inference portion 412, an AEP prediction portion 414 and an AEP inference portion 416.

FIG. 4B gives an example embodiment of an inference workflow of the meta-NIC encoder 410 for an i-th layer. In the meta-NIC encoder 410, the substitute input image x' is passed through a meta-NIC encoding NN. Let f(i) and f(i+1) denote an input tensor and an output tensor of an i-th layer. Based on a current input f(i) (based on the substitute input image) and SEP $\theta_s^e(i)$, the SEP inference portion 412 computes one or more shared features g(i) based on a shared inference function $G_i(f(i), \theta_s^e(i))$ that may be modeled by a forward computation using the SEP in the i-th layer. Based on the current input f(i), the shared features g(i), AEP $\theta_a^e(i)$ and the substitute target quality control parameter $\Lambda'$, the AEP prediction portion 414 computes estimated AEP $\hat{\theta}_a^e(i)$ for the i-th layer. The AEP prediction portion 414 may be an NN, e.g., including convolution and fully connected layers, which predicts the updated estimated AEP $\hat{\theta}_a^e(i)$ based on the original AEP $\theta_a^e(i)$, the current input f(i), and the substitute target quality control parameter $\Lambda'$. In some embodiments, the current input f(i) may be used as an input to the AEP prediction portion 414. In some other embodiments, the shared features g(i) may used instead of the current input f(i). In other embodiments, an SEP loss may be computed based on the shared features g(i), and a gradient of the loss may be used as input to the AEP prediction portion 414. Based on the estimated AEP $\hat{\theta}_a^e(i)$ and the shared feature g(i), the AEP inference portion 416 computes an output tensor f(i+1) based on an AEP inference function $A_i(g(i), \hat{\theta}_a^e(i))$ that is modeled by the forward computation using the estimated AEP in the i-th layer.

Note that the workflow described in FIG. 4B is an exemplary notation. For a layer that is completely shared with the AEP, $\theta_a^e(i)$ may be empty, AEP-related modules and f(i+1)=g(i) may be omitted. For a layer that is completely adaptive with the SEP, $\theta_s^e(i)$ may be empty, SEP-related modules and g(i)=f(i) may be omitted.

In embodiments where there are a total of N layers for the meta-NIC encoder 410, an output of a last layer is a compressed representation y. The compressed representation y may be sent to the meta-NIC decoder 420. In some embodiments, the compressed representation y may be sent to the meta-NIC decoder 420 after being further compressed into a compact bitstream z by quantization and entropy encoder 425.

Referring again to FIG. 4A, on a decoder side, let $\theta_s^d(j)$ and $\theta_a^d(j)$ denote SDP and ADP for a j-th layer of the meta-NIC decoder 420, respectively. Similar to the meta-NIC encoder 410, this is an example notation, because for a layer that is completely shared, $\theta_a^d(j)$ is empty, and for a layer that is completely adaptive, $\theta_s^d(j)$ is empty.

On a decoder side, a recovered compressed representation $\bar{y}'$ may obtained from a bitstream z sent from the meta-NIC encoder 410 using dequantization and entropy decoding. In some embodiments, the compressed representation $\bar{y}$ may be passed through a Quantization & Rate Estimator 430 to generate a recovered compressed representation $\bar{y}'$.

Based on the recovered compressed representation $\bar{y}'$ and the substitute target quality control parameter $\Lambda'$, the meta-NIC decoder 420 computes a reconstructed output image $\bar{x}$. In the meta-NIC decoder 420, the recovered compressed representation $\bar{y}'$ is passed through the meta-NIC decoding NN. Let f(j) and f(j+1) denote an input tensor and an output tensor of a j-th layer.

Figure 4C:
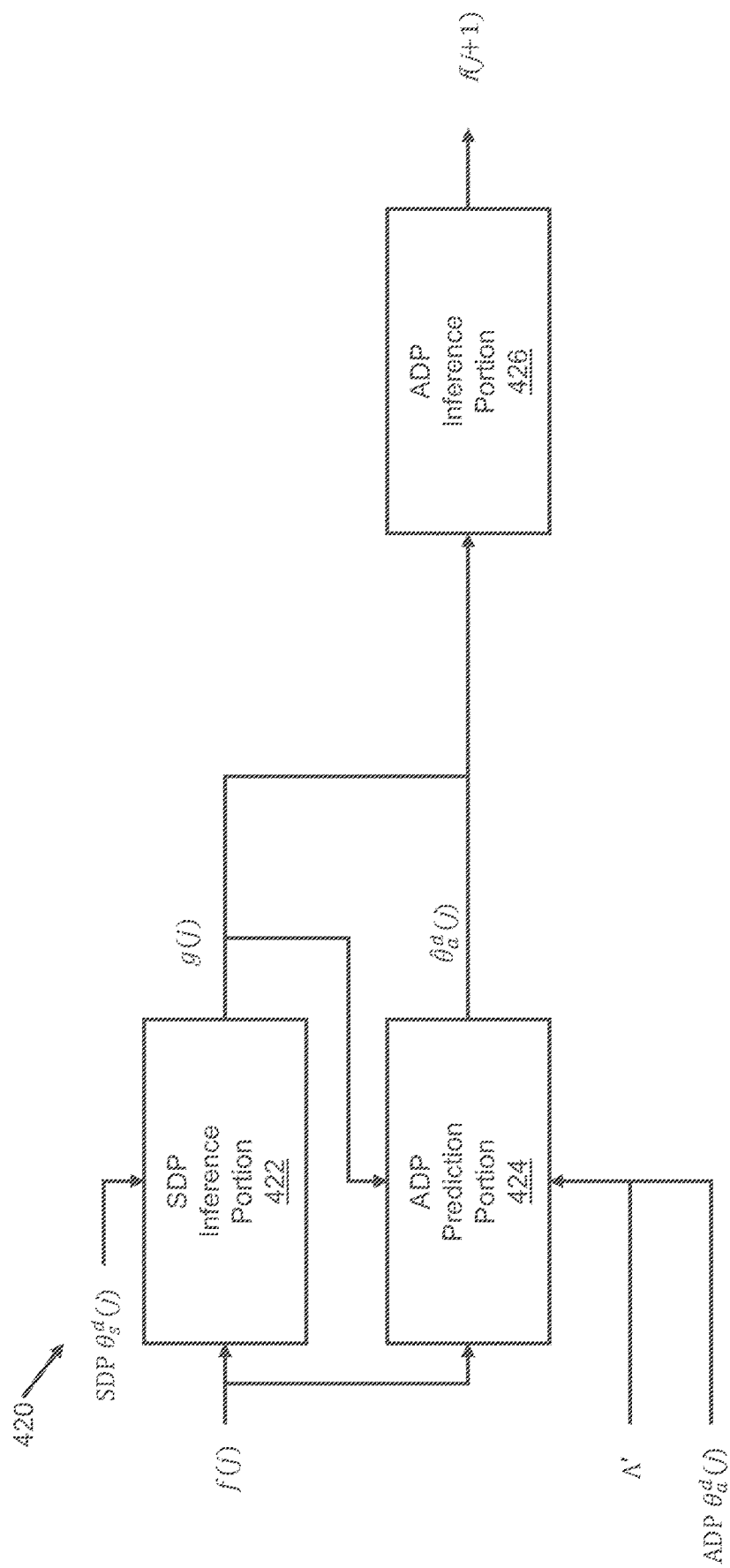
FIG. 4C is a block diagram of a meta-NIC decoder of the apparatus shown in FIG. 4A, according to embodiments.

FIG. 4C is a block diagram of the meta-NIC decoder 420 of the apparatus 400A shown in FIG. 4A.

As shown in FIG. 4C, the meta-NIC decoder 420 includes an SDP inference portion 422, an ADP prediction portion 424 and an ADP inference portion 426.

FIG. 4C gives an example embodiment of an inference workflow of the meta-NIC decoder 420 for a j-th layer. Based on a current input f(j) (in some embodiments based on the recovered compressed representation) and SDP $\theta_s^d(j)$, the SDP inference portion 422 computes one or more shared features g(j) based on a shared inference function $G_j(f(j), \theta_s^d(j))$ that is modeled by a network forward computation using the SDP of the j-th layer. Based on the current input f(j), the shared features g(j), ADP $\theta_a^d(j)$ and the substitute target quality control parameter $\Lambda'$, the ADP prediction portion 424 computes estimated ADP $\hat{\theta}_a^d(j)$ for the j-th layer. The ADP prediction portion 424 may be an NN, e.g., with convolution and fully connected layers, which predicts the updated estimated $\hat{\theta}_a^d(j)$ based on the original ADP $\theta_a^d(i)$, the current input f(j), and the substitute target quality control parameter $\Lambda'$. In some embodiments, the current input f(j) may be used as input to the ADP prediction portion 424. In some other embodiments, the shared features g(j) may be used instead of the current input f(j). In other embodiments, an SDP loss may be computed based on the shared features g(j), and a gradient of the loss may be used as input to the ADP prediction portion 424. Based on the estimated ADP $\hat{\theta}_a^d(j)$ and the shared features g(j), the ADP inference portion 426 computes an output tensor f(j+1) based on an ADP inference function $A_j(g(j), \hat{\theta}_a^d(j))$ that is modeled by the network forward computation using estimated ADP in the j-th layer.

Note that the workflow described in FIG. 4C is an exemplary notation. For a layer that is completely shared with ADP, $\theta_a^d(j)$ may be empty, and ADP-related modules and f(j+1)=g(j) may be omitted. For a layer that is completely adaptive with SDP, $\theta_s^d(j)$ may be empty, and SDP-related modules and g(j)=f (j) may be omitted.

In embodiments where there are a total of M layers for the meta-NIC decoder 420, an output of a last layer is a reconstructed image output x.

The meta-NIC framework provided in the above-mentioned embodiment allows an arbitrary target quality control parameter $\Lambda$ and/or the substitute target quality control parameter $\Lambda'$, and a processing workflow will compute a compressed representation and a reconstructed output image to fit the target quality control parameter $\Lambda$.

In some embodiments, the target quality control parameter $\Lambda$ and/or the substitute target quality control parameter $\Lambda'$ is the same for encoder and decoder. In some other embodiments, the target quality control parameter $\Lambda$ and/or the substitute target quality control parameter $\Lambda'$ may be different for the meta-NIC encoder 410 and the meta-NIC decoder 420. In embodiments where there is a difference in the target quality control parameter $\Lambda$ and/or the substitute target quality control parameter $\Lambda'$ between the meta-NIC encoder 410 and the meta-NIC decoder 420, the meta-NIC decoder 420 tries to adapt the compressed representation to a different target quality from an original encoding target quality.

According to embodiments of the present disclosure, when the AEP prediction portion 414 and the ADP prediction portion 424 only perform prediction over a pre-defined set of trade-off hyperparameters with/without considering the input f(i) or f(j), a meta-NIC model reduces to a multi-rate NIC model that uses one model instance to accommodate compression effects of multiple pre-defined bitrates.

Referring back to FIG. 4A, the quantization and rate estimator 430 may simulate true quantization and entropy encoding/decoding process by using differentiable statistic sampler. In some embodiments, the quantization and rate estimator 430 may be a part of the underlying NIC framework/architecture. In other words, when the underling NIC architecture includes a quantization and rate estimator, the quantization and rate estimator 430 may correspond to the quantization and rate estimator of the underlying NIC architecture. The quantization and rate estimator 430 may be used to determine the recovered compressed representation $\bar{y}'$ and estimated rate loss $R(\bar{y})$.

Based on the reconstructed image $\bar{x}$ and the original input image x, a loss generator 405 may compute a distortion loss D (x, $\bar{x}$) based on Equation (2) which may then be combined with rate loss $R(\bar{y})$ to determine overall rate-distortion loss L(x, $\bar{x}$, $\bar{y}$) from Equation (1) using the original target quality control parameter Λ. According to embodiments of the present disclosure, the loss generator 405 may use or take into account other adversarial or regularization losses such as any additional regularization terms over the reconstructed image $\bar{x}$ or over the compressed representation $\bar{y}$.

The overall rate-distortion loss L (x, $\bar{x}$, $\bar{y}$) may be passed through a backpropagation module 415 that may compute a gradient of the loss L (x, $\bar{x}$, $\bar{y}$). The gradient of the loss L (x, $\bar{x}$, $\bar{y}$) is then back propagated to update the substitute input image x' and the substitute target quality control parameter Λ'. This process of computing loss L (x, $\bar{x}$, $\bar{y}$) and back propagating the gradient of the loss L (x, $\bar{x}$, $\bar{y}$) is repeated for the next of a plurality of online learning iterations. In some embodiments, the substitute input image x' may be initialized as the original input image x, and the substitute target quality control parameter Λ' may be initialized as the original target quality control parameter Λ'. The substitute input image x' and the substitute target quality control parameter Λ' are then updated through the online iterations.

The online learning process is completed after a total of T iterations to obtain a final substitute input image x' and a final substitute target quality control parameter Λ'. In some embodiments, T iterations may refer to a maximum number of iterations. In some embodiments, the online learning process may be completed when the changes to the substitute input image x' and the substitute target quality control parameter Λ' are smaller then preset thresholds. The final substitute input image x' and the final substitute target quality control parameter Λ' are then passed through the Meta-NIC encoder 410 to generate the compressed representation $\bar{y}$. The compressed representation $\bar{y}$ may be passed through the quantization and entropy encoder 425 to generate a compressed bitstream z. The quantization and entropy encoder 425 may perform true quantization and entropy encoding on the compressed representation y.

In some embodiments, the compressed bitstream z and the final substitute target quality control parameter Λ' may be sent to the Meta-NIC decoder 420. Further, in some embodiments, final substitute target quality control parameter Λ' may be further encoded in a lossless way before transmission.

Figure 4D:
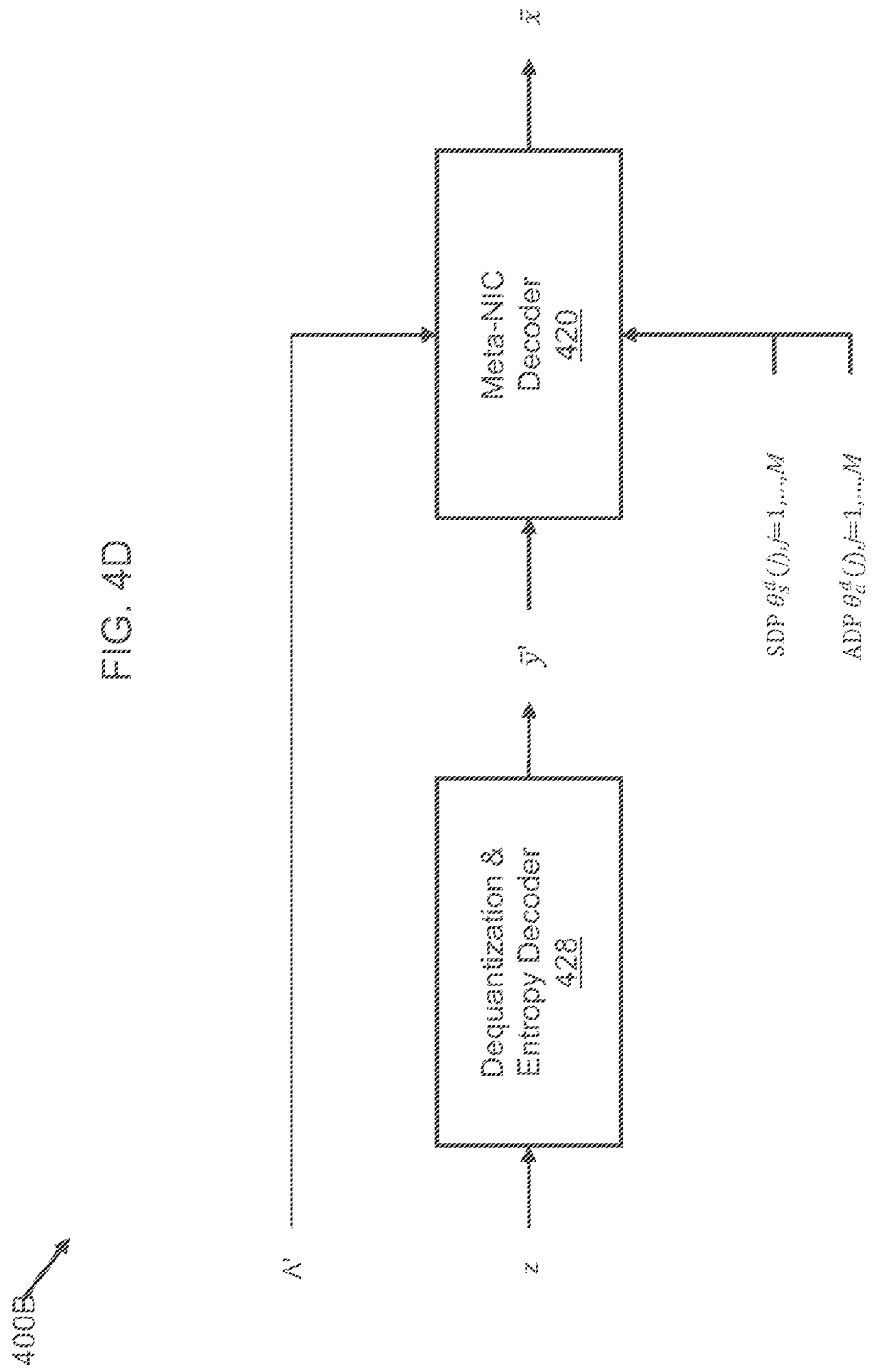
FIG. 4D is an apparatus for decoding an image encoded using adaptive neural image compression with smooth quality control, according to embodiments.

FIG. 4D is a partial view of an apparatus for decoding an image encoded using adaptive neural image compression with smooth quality control, according to embodiments the apparatus 400A shown in FIG. 4A.

As shown in FIG. 4D, according to some embodiments, decoding an image encoded using adaptive neural image compression with smooth quality control includes the meta-NIC decoder 420 and a dequantization and entropy decoder 428.

FIG. 4D gives an example embodiment of a decoding workflow of the meta-NIC framework. On the decoder side, the compressed bitstream z and the final substitute target quality control parameter Λ' or a losslessly compressed version of the substitute target quality control parameter Λ' may be received. The dequantization and entropy decoder 428 generates the recovered compressed representation $\bar{y}'$ using the compressed bitstream z. In an embodiment, when the losslessly compressed version of the substitute target quality control parameter Λ' is received, the dequantization and entropy decoder 428 may recover the substitute target quality control parameter Λ'. Then, the meta-NIC decoder 420 computes the reconstructed image $\bar{x}$ based on the recovered compressed representation $\bar{y}'$, the substitute target quality control parameter Λ', ADP $\theta_a^d(j)$, and SDP $\theta_s^d(j)$, when j=1, 2, . . . , M.

According to embodiments of the present disclosure, when the AEP prediction portion 424 and the ADP prediction portion 424 only perform prediction over a pre-defined set of trade-off hyperparameters with/without considering the input f(i) or f(j), and for a pre-defined set of combining weights (e.g., targeting a distortion metric $D_i$ (x, $\bar{x}$) only with $w_i$=1 and $w_j$=0 for i≠j) the meta-NIC model reduces to a multi-rate NIC model for the distortion metric $D_i$(x, $\bar{x}$) that uses one model instance to accommodate compression effects of multiple pre-defined bitrates.

According to some embodiments of the present disclosure, the model parameters, i.e., SEP $\theta_s^e(i)$ and AEP $\theta_a^e(i)$ (where i=1, . . . , N) for the meta-NIC encoder 410, the SDP $\theta_s^d(j)$ and ADP $\theta_a^d(j)$ (where j=1, . . . , M) for the meta-NIC decoder 420, the AEP prediction NN (model parameters denoted as (De), and the ADP prediction NN (model parameters denoted as $\Phi^d$) may be pre-trained and fixed during the encoding and decoding as described in FIGS. 4A-4D.

Figure 5:
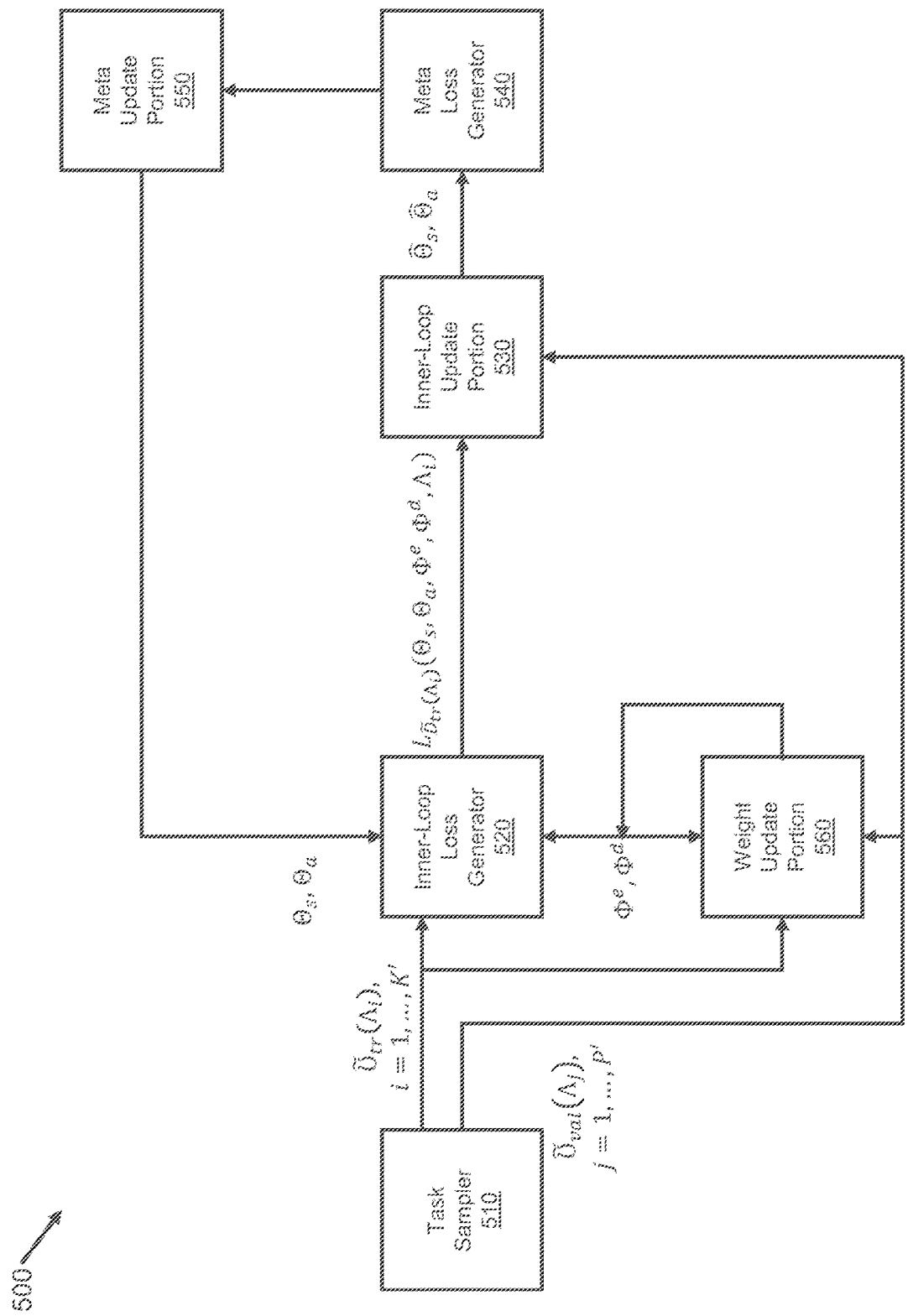
FIG. 5 is a block diagram of a training apparatus for adaptive neural image compression with smooth quality control, during a training stage, according to embodiments.

FIG. 5 is a block diagram of a training apparatus 500 for adaptive neural image compression with smooth quality control by meta-learning, during a training stage, according to embodiments.

As shown in FIG. 5, the training apparatus 500 includes a task sampler 510, an inner-loop loss generator 520, an inner-loop update portion 530, a meta loss generator 540, a meta update portion 550 and a weight update portion 560.

A training process aims at learning SEP $\theta_s^e(i)$ and AEP $\theta_a^e(i)$, i=1, . . . , N for the meta-NIC encoder 410 of FIG. 4A and SDP $\theta_s^d(j)$ and ADP $\theta_a^d(j)$, i=1, . . . , M for the meta-NIC decoder 420 of FIG. 4A, as well as an AEP prediction NN (model parameters denoted as $\Phi^e$) and an ADP prediction NN (model parameters denoted as $\Phi^d$).

In embodiments, a Model-Agnostic Meta-Learning (MAML) mechanism is used for a training purpose. FIG. 5 gives an example workflow of a meta-training framework. Other meta-training algorithms can be used here.

For training, there is a set of training data $\Omega_{tr}(\Lambda_i)$, i=1, . . . , K, where each $\Omega_{tr}(\Lambda_i)$ corresponds to a training trade-off hyperparameter $\Lambda_i$, and there are K training quality control parameters (thus K training data sets) in total. For training, there may be a finite set of weight combinations. For each weight combination $w_1$=$a_1$, . . . $w_q$=$a_q$, there may be a set of k trade-off hyperparameters $\lambda_j$, where the quality control parameter $\Lambda_i$ specifies the values of the items in the quality control parameter Λ, $w_1$=$a_1$, . . . $w_q$=$a_q$, $\lambda$=$\lambda_i$. In addition, there is a set of validation data $\Omega_{val}(\lambda_j)$, j=1, . . . , P, where each $\Omega_{val}(\lambda_j)$ corresponds to a validation quality control parameter $\Lambda_1$, and there are P validation quality control parameter $\Lambda_j$ in total. The validation quality control parameter may include different values from the training set. The validation quality control parameter may also have same values as those from the training set.

An overall training goal is to learn a meta-NIC model so that it can be broadly applied to all (including training and future unseen) values of quality control parameter, corresponding to a broad smooth range of target compression qualities. The assumption being that an NIC task with a target quality control parameter is drawn from a task distribution P (A). To achieve the training goal mentioned above, a loss for learning the meta-NIC model is minimized across all training data sets across all training quality control parameters.

Let $\Theta_s = \{\theta_s^e, \theta_s^d\}$ include all shared parameters in SEP and SDP, and let $\Theta_a = \{\theta_a^e, \theta_a^d\}$ include all adaptive parameters in AEP and ADP. The MAML training process may have an outer loop and an inner loop for gradient-based parameter updates. For each outer loop iteration, the task sampler 510 first samples a set of K' training quality control parameters (K'≤K). Then for each sampled training quality control parameter $\Lambda_i$, the task sampler 510 samples a set of training data $\tilde{\Omega}_{tr}(\Lambda_i)$ from the set of training data $\Omega_{tr}(\Lambda_i)$. Also, the task sampler 510 samples a set of P' (P'≤P) validation quality control parameters, and for each sampled validation quality control parameter $\Lambda_j$, samples a set of validation data $\tilde{\Omega}_{val}(\Lambda_j)$ from the set of validation data $\Omega_{val}(\Lambda_j)$. Then for each sampled datum $x \in \tilde{\Omega}_{tr}(\Lambda_i)$, a meta-NIC forward computation is conducted based on current parameters $\Theta_s$, $\Theta_a$, $\Phi^e$ and $\Phi^d$, and the inner-loop loss generator 520 then computes an accumulated inner-loop loss $L_{\tilde{\Omega}_{tr}(\Lambda_i)}(\Theta_s, \Theta_a, \Phi^e, \Phi^d, \Lambda_i)$:

$$L_{\tilde{\Omega}_{tr}(\Lambda_i)}(\Theta_s, \Theta_a, \Phi^e, \Phi^d, \Lambda_i) = \sum_{x \in \tilde{\Omega}_{tr}(\Lambda_i)} L(x, \Theta_s, \Theta_a, \Phi^e, \Phi^d, \Lambda_i). \quad (3)$$

The loss function $L(x, \Theta_s, \Theta_a, \Phi^e, \Phi^d, \Lambda_i)$ may include an R-D loss of Equation (1) and another regularization loss (e.g., an auxiliary loss of distinguishing an intermediate network output targeting different quality control parameters). Then, based on the inner-loop loss $L_{\tilde{\Omega}_{tr}(\Lambda_i)}(\Theta_s, \Theta_a, \Phi^e, \Phi^d, \Lambda_i)$, given step sizes $\alpha_{si}$ and $\alpha_{ai}$ as quality control parameters/hyperparameters for $\Lambda_i$, the inner-loop update portion 530 computes an updated task-specific parameter update:

$$\hat{\Theta}_a = \Theta_a - \sum_{i=1}^{K'} \alpha_{ai} \nabla_{\Theta_a} L_{\tilde{\Omega}_{tr}(\Lambda_i)}(\Theta_s, \Theta_a, \Phi^e, \Phi^d, \Lambda_i); \text{ and} \quad (4)$$

$$\hat{\Theta}_s = \Theta_s - \sum_{i=1}^{K'} \alpha_{si} \nabla_{\Theta_s} L_{\tilde{\Omega}_{tr}(\Lambda_i)}(\Theta_s, \Theta_a, \Phi^e, \Phi^d, \Lambda_i). \quad (5)$$

Gradient $\nabla_{\Theta_a} L_{\tilde{\Omega}_{tr}(\Lambda_i)}(\Theta_s, \Theta_a, \Phi^e, \Phi^d, \Lambda_i)$ and gradient $\nabla_{\Theta_s} L_{\tilde{\Omega}_{tr}(\Lambda_i)}(\Theta_s, \Theta_a, \Phi^e, \Phi^d, \Lambda_i)$ of the accumulated inner-loop loss $L_{\tilde{\Omega}_{tr}(\Lambda_i)}(\Theta_s, \Theta_a, \Phi^e, \Phi^d, \Lambda_i)$ may be used to compute an updated version of adaptive parameters $\hat{\Theta}_a$ and $\hat{\Theta}_s$, respectively.

Then, a meta loss generator 540 computes an outer meta objective or loss over all sampled validation quality control parameters:

$$L(\Theta_s, \Theta_a, \Phi^e, \Phi^d) = \sum_{j=1}^{P'} L_{\tilde{\Omega}_{val}(\Lambda_j)}(\hat{\Theta}_s, \hat{\Theta}_a, \Phi^e, \Phi^d, \Lambda_j); \text{ and} \quad (6)$$

$$L_{\tilde{\Omega}_{val}(\Lambda_j)}(\hat{\Theta}_s, \hat{\Theta}_a, \Phi^e, \Phi^d, \Lambda_j) = \sum_{x \in \tilde{\Omega}_{val}(\Lambda_j)} L(x, \hat{\Theta}_s, \hat{\Theta}_a, \Phi^e, \Phi^d, \Lambda_j), \quad (7)$$

where $L(x, \hat{\Theta}_s, \hat{\Theta}_a, \Phi^s, \Phi^a, \Lambda_i)$ is the loss computed for an input x based on the meta-NIC forward computation using parameters $\hat{\Theta}_s$, $\hat{\Theta}_a$, $\Phi^s$, $\Phi^a$. Given step size $\beta_{aj}$ and $\beta_{sj}$ as hyperparameters for $\Lambda_1$, the meta update portion 550 updates the model parameters as:

$$\Theta_a = \Theta_a - \sum_{j=1}^{P'} \beta_{aj} \nabla_{\Theta_a} L_{\tilde{\Omega}_{val}(\Lambda_j)}(\hat{\Theta}_s, \hat{\Theta}_a, \Phi^e, \Phi^d, \Lambda_j); \text{ and} \quad (8)$$

$$\Theta_s = \Theta_s - \sum_{j=1}^{P'} \beta_{sj} \nabla_{\Theta_s} L_{\tilde{\Omega}_{val}(\Lambda_j)}(\hat{\Theta}_s, \hat{\Theta}_a, \Phi^e, \Phi^d, \Lambda_j). \quad (9)$$

In some embodiments, $\Theta_s$ may not be updated in the inner loop, i.e., $\alpha_{si}=0$, $\hat{\Theta}_s=\Theta_s$. The non-updating helps to stabilize the training process.

As for parameters $\Phi^e$, $\Phi^d$ of the AEP Prediction NN and ADP prediction NN, the weight update portion 560 updates them in a regular training manner. That is, according to the training and validation data $\Omega_{tr}(\Lambda_i)$, i=1, . . . , K, $\Omega_{val}(\Lambda_i)$, j=1, . . . , P, based on the current parameters $\Theta_s$, $\Theta_a$, $\Phi^e$, $\Phi^d$, a loss $L(x, \Theta_s, \Theta_a, \Phi^e, \Phi^d, \Lambda_1)$ for all samples $x \in \Omega_{tr}(\Lambda_i)$ and a loss $L(x, \Theta_s, \Theta_a, \Phi^e, \Phi^d, \Lambda_j)$ for all samples $x \in \Omega_{val}(\Lambda_j)$ are computed. Gradients of all these losses can be accumulated (e.g., added up) to perform parameter updates over $\Phi^e$, $\Phi^d$ through backpropagation.

Embodiments of the present disclosure are not restricted to the above-mentioned optimization algorithm or loss functions for updating these model parameters. Any optimization algorithm or loss functions for updating these model parameters known in the art may be used.

For a case in which the AEP prediction portion 414 of FIG. 4B and the ADP prediction portion 424 of a meta-NIC model only perform prediction over a pre-defined set of training quality control parameters and/or a pre-defined set of metric combining weights, validation quality control parameters may be the same as the training ones. The same MAML training procedure may be used to train the above-mentioned reduced meta-NIC model (i.e., a multi-rate NIC model that uses one model instance to accommodate compression effects of multiple pre-defined bitrates).

Embodiments of the present disclosure allows for using a superior substitute input image which is an altered version of the original input image and a superior substitute target quality control parameter to adaptively improve the compression performance for each input data. The embodiments described herein enable using only one meta-NIC model instance to achieve image compression with arbitrary smooth quality control using meta learning. The methods and apparatuses may be used for both multi-rate compression with a single model and smooth bitrate control. The embodiments described herein may be used for both multi-metric and multi-rate compression with a single model, smooth bitrate control, and smooth quality metric control. The embodiments provide a flexible framework that accommodates various underlying NIC models and meta-learning methods.

Figure 6:
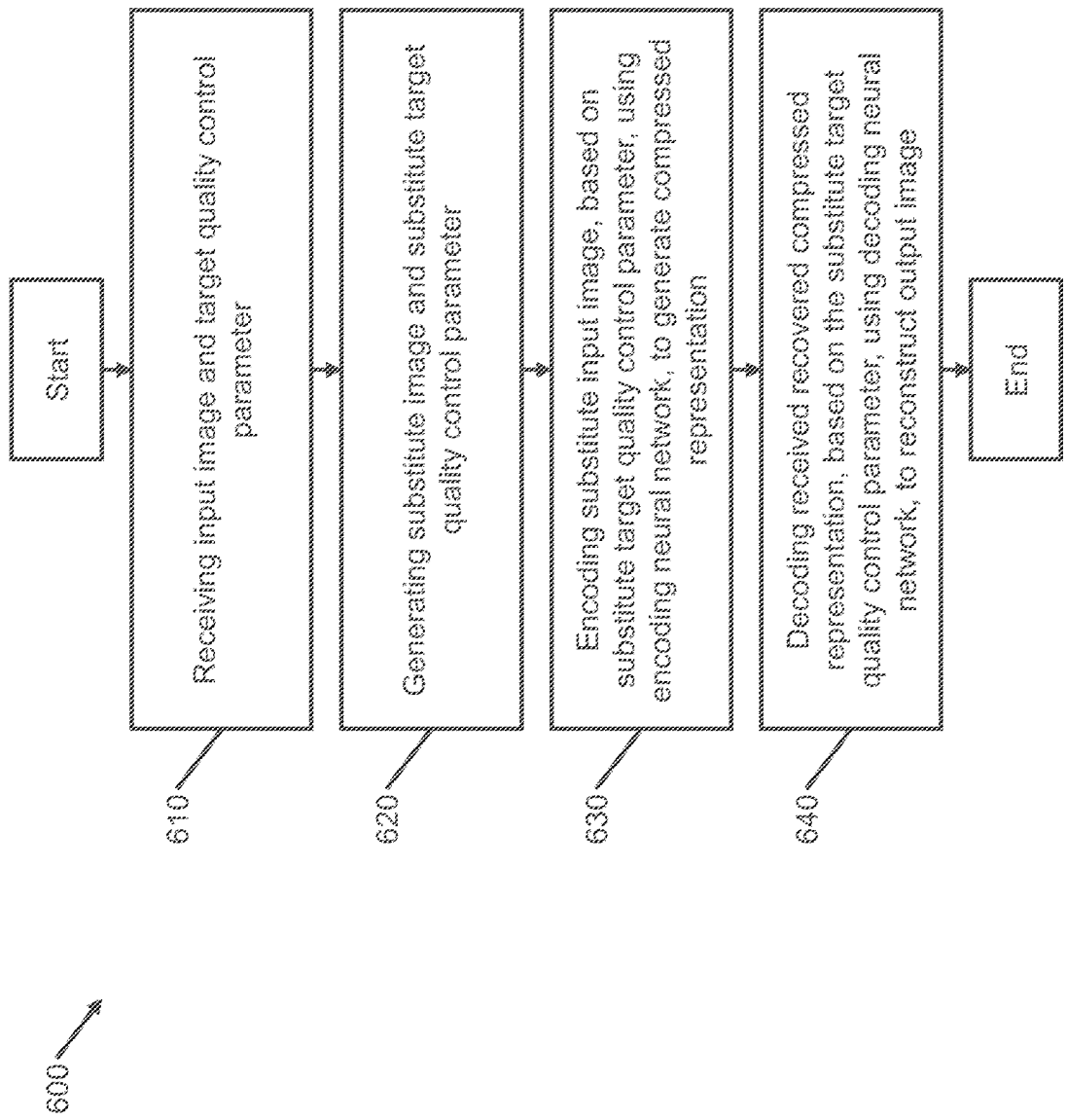
FIG. 6 is a flowchart of a method of adaptive neural image compression with smooth quality control, according to embodiments.

FIG. 6 is a flowchart of a method of adaptive neural image compression with rate control by meta-learning, according to embodiments.

In some implementations, one or more process blocks of FIG. 6 may be performed by the platform 120. In some implementations, one or more process blocks of FIG. 6 may be performed by another device or a group of devices separate from or including the platform 120, such as the user device 110.

As shown in FIG. 6, in operation 610, the method 600 includes receiving an input image and a target quality control parameter.

In operation 620, the method 600 includes generating a substitute input image and a substitute target quality control parameter using an original input image and a target quality control parameter. The substitute input image is a modified version of an input image and the substitute target quality control parameter is a modified version of a target quality control parameter.

The generating of the substitute input image includes performing a plurality of iterations, wherein each iteration includes computing an overall rate-distortion loss using the target quality control parameter; computing a gradient of the overall rate-distortion loss using backpropagation; and updating the substitute input image and the substitute target quality control parameter based on the gradient of the overall rate-distortion loss. In some embodiments, performing a first iteration from the plurality of iterations may include initializing the substitute input image as the input image and the substitute target quality control parameter as the target quality control parameter.

A number of the plurality of iterations may be based on updates to the substitute input image being less than a first preset thresholds. In some embodiments, the number of iterations may be based on updates to the substitute target quality control parameter being less than a second threshold. In some embodiments, the number of iterations may be a preset or pre-defined number.

In operation 630, the method 600 includes encoding the substitute input image, based on the substitute target quality control parameter, using an encoding neural network, to generate a compressed representation. In some embodiments, at operation 630, a compressed representation of the substitute input image may be generated based on the substitute input image and the substitute target quality control parameter using an encoding neural network. The generation of the compressed representation includes encoding the substitute input image using the encoding neural network. The encoding may include generating a first combined output based on a combination of a first shared encoding performed on the substitute input image using first shared encoding parameters, and a first adaptive encoding performed on the substitute input image using first adaptive encoding parameters. The encoding may further include generating a second combined output based on a combination of a second shared encoding performed on the first combined output using second shared encoding parameters, and a second adaptive encoding performed on the first combined output using second adaptive encoding parameters.

In some embodiments, the encoding may include performing a first shared encoding on the substitute input image, using a first shared encoding layer having first shared encoding parameters, performing a first adaptive encoding on the substitute input image, using a first adaptive encoding layer having first adaptive encoding parameters, combining the first shared encoded input image and the first adaptive encoded input image, to generate a first combined output, and performing a second shared encoding on the first combined output, using a second shared encoding layer having second shared encoding parameters. The encoding may further include performing a second adaptive encoding on the first combined output, using a second adaptive encoding layer having second adaptive encoding parameters.

The generating of the first combined output may include generating shared features based on the substitute input image and a first shared encoding parameters, and generating estimated first adaptive encoding parameters based on the substitute input image, the substitute target quality control parameter, the first adaptive encoding parameters, and the generated shared features, using a prediction neural network. Then the first combined output may be generated based on the generated shared features and the generated estimated first adaptive encoding parameters.

In some embodiments, the prediction neural network may be trained by generating a first loss for training data corresponding to the substitute target quality control parameter, and a second loss for validation data corresponding to substitute target quality control parameter, based on the substitute target quality control parameter, the first shared encoding parameters, the first adaptive encoding parameters, the first shared decoding parameters, the first adaptive decoding parameters, and prediction parameters of the prediction neural network. The training of the prediction neural network may further include updating the prediction parameters, based on gradients of the generated first loss and the generated second loss.

In operation 630, the method 600 may further include generating a compressed bitstream based on the compressed representation of the substitute input image using quantization and entropy encoding.

As shown in FIG. 6, in operation 640, the method 600 may further include decoding the recovered compressed representation, based on the received substitute target quality control parameter, using a decoding neural network, to reconstruct an output image. In some embodiments, the decoding may be preceded by a receiving operation including receiving the recovered compressed bitstream and the substitute target quality control parameter. When the recovered compressed bitstream and the substitute target quality control parameter are received, the method 600 may include generating a recovered compressed representation, based on the recovered compressed bitstream and the received substitute target quality control parameter using dequantization and entropy decoding.

The decoding of the recovered compressed representation may include decoding the recovered compressed representation using the decoding neural network. The decoding may include generating a first combined output based on a combination of a first shared decoding performed on the recovered compressed representation using first shared decoding parameters, and a first adaptive decoding performed on the recovered compressed representation using first adaptive decoding parameters. The decoding may further include generating a second combined output based on a combination of a second shared decoding performed on the first combined output using second shared decoding parameters, and a second adaptive decoding performed on the first combined output using second adaptive decoding parameters.

In some embodiments, the decoding may include performing a first shared decoding on the recovered compressed representation, using a first shared decoding layer having first shared decoding parameters, performing a first adaptive decoding on the recovered compressed representation, using a first adaptive decoding layer having first adaptive decoding parameters, combining the first shared decoded input image and the first adaptive decoded recovered compressed representation, to generate a first combined output, and performing a second shared decoding on the first combined output, using a second shared decoding layer having second shared decoding parameters. The decoding may further include performing a second adaptive decoding on the first combined output, using a second adaptive decoding layer having second adaptive decoding parameters.

The generating of the first combined output may include generating shared features based on the recovered compressed representation and the first shared decoding parameters, and generating estimated first adaptive decoding parameters based on the recovered compressed representation, the received substitute target quality control parameter, the first adaptive decoding parameters, and the generated shared features, using a prediction neural network. Then the first combined output may be generated based on the generated shared features and the generated estimated first adaptive decoding parameters.

The encoding neural network and the decoding neural network may be trained by generating an inner-loop loss for training data corresponding to the substitute target quality control parameter, based on the substitute target quality control parameter, the first shared encoding parameters, the first adaptive encoding parameters, the first shared decoding parameters, and the first adaptive decoding parameters. The training may further include first updating the first shared encoding parameters, the first adaptive encoding parameters, the first shared decoding parameters and the first adaptive decoding parameters, based on gradients of the generated inner-loop loss. Then, the training may include generating a meta loss for validation data corresponding to the substitute target quality control parameter, based on the substitute target quality control parameter, the first updated first shared encoding parameters, the first updated first adaptive encoding parameters, the first updated first shared decoding parameters, and the first updated first adaptive decoding parameters. In some embodiments the training may further include a second updating the first updated first shared encoding parameters, the first updated first adaptive encoding parameters, the first updated first shared decoding parameters, and the first updated first adaptive decoding parameters, based on gradients of the generated meta loss.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of adaptive neural image compression by meta-learning, the method being performed by at least one processor, and the method comprising:
generating a substitute input image and a substitute target quality control parameter via a plurality of iterations using an original input image and an original target quality control parameter, wherein the substitute input image is a modified version of the original input image and the substitute target quality control parameter is a modified version of the original target quality control parameter; and
encoding the substitute input image, based on the substitute input image and the substitute target quality control parameter, using an encoding neural network, to generate a compressed representation of the substitute input image, wherein the encoding comprises:
generating a first combined output based on a first combination of a first shared encoding performed on the substitute input image using first shared encoding parameters and a first adaptive encoding performed on the substitute input image using first adaptive encoding parameters; and
generating a second combined output based on a second combination of a second shared encoding performed on the first combined output using second shared encoding parameters and a second adaptive encoding performed on the first combined output using second adaptive encoding parameters.

2. The method of claim 1, wherein the generating the substitute input image comprises, for each of the plurality of iterations:
computing an overall rate-distortion loss using the original target quality control parameter;
computing a gradient of the overall rate-distortion loss using backpropagation; and updating the substitute input image and the substitute target quality control parameter based on the gradient of the overall rate-distortion loss.

3. The method of claim 2, wherein a number of the plurality of iterations is based on updates to the substitute input image being less than a first preset threshold.

4. The method of claim 2, wherein a number of the plurality of iterations is based on updates to the substitute target quality control parameter being less than a second threshold.

5. The method of claim 2, wherein performing a first iteration from the plurality of iterations comprises initializing the substitute input image as the original input image and the substitute target quality control parameter as the original target quality control parameter.

6. The method of claim 1, further comprising generating a compressed bitstream based on the compressed representation of the substitute input image using quantization and entropy encoding.

7. The method of claim 1, further comprising:
receiving a recovered compressed bitstream and the substitute target quality control parameter;
generating a recovered compressed representation, based on the recovered compressed bitstream and the received substitute target quality control parameter using dequantization and entropy decoding; and
decoding the generated recovered compressed representation based on the received substitute target quality control parameter using a decoding neural network to reconstruct an output image.

8. The method of claim 1, wherein generating the first combined output comprises:
generating shared features based on the substitute input image and the first shared encoding parameters;
generating estimated first adaptive encoding parameters based on the substitute input image, the substitute target quality control parameter, the first adaptive encoding parameters, and the generated shared features, using a prediction neural network; and
generating the first combined output based on the generated shared features and the generated estimated first adaptive encoding parameters.

9. An apparatus for adaptive neural image compression by meta-learning, the apparatus comprising:
at least one memory configured to store computer program code; and
at least one processor configured to access the computer program code and operate as instructed by the computer program code, the computer program code including:
first generating code configured to cause the at least one processor to generate a substitute input image and a substitute target quality control parameter using an original input image and an original target quality control parameter, wherein the substitute input image is a modified version of the original input image and the substitute target quality control parameter is a modified version of the original target quality control parameter; and
encoding code configured to cause the at least one processor to encode the substitute input image, based on the substitute input image and the substitute target quality control parameter, using an encoding neural network, to generate a compressed representation of the substitute input image, wherein the encoding code comprises:

second generating code configured to cause the at least one processor to generate a first combined output based on a first combination of a first shared encoding performed on the substitute input image using first shared encoding parameters and a first adaptive encoding performed on the substitute input image using first adaptive encoding parameters; and
third generating code configured to cause the at least one processor to generate a second combined output based on a second combination of a second shared encoding performed on the first combined output using second shared encoding parameters and a second adaptive encoding performed on the first combined output using second adaptive encoding parameters.

10. The apparatus of claim 9, wherein the first generating code further comprises:
for each of a plurality of iterations:
first computing code configured to cause the at least one processor to compute an overall rate-distortion loss using the original target quality control parameter;
second computing code configured to cause the at least one processor to compute a gradient of the overall rate-distortion loss using backpropagation; and
first updating code configured to cause the at least one processor to update the substitute input image and the substitute target quality control parameter based on the gradient of the overall rate-distortion loss.

11. The apparatus of claim 10, wherein for a first iteration, the first generating code comprises fourth generating code configured to cause the at least one processor to generate a compressed bitstream based on the compressed representation of the substitute input image using quantization and entropy encoding.

12. The apparatus of claim 9, wherein the program code further incudes:
receiving code configured to cause the at least one processor to receive a recovered compressed bitstream and the substitute target quality control parameter;
fifth generating code configured to cause the at least one processor to generate a recovered compressed representation, based on the recovered compressed bitstream and the received substitute target quality control parameter using dequantization and entropy decoding; and
decoding code configured to cause the at least one processor to decode the generated recovered compressed representation based on the received substitute target quality control parameter using a decoding neural network to reconstruct an output image.

13. The apparatus of claim 9, wherein the fourth generating code comprises:
sixth generating code configured to cause the at least one processor to generate shared features based on the substitute input image and the first shared encoding parameters;
seventh generating code configured to cause the at least one processor to generate estimated first adaptive encoding parameters based on the substitute input image, the substitute target quality control parameter, the first adaptive encoding parameters, and the generated shared features, using a prediction neural network; and
eighth generating code configured to cause the at least one processor to generate the first combined output based on the generated shared features and the generated estimated first adaptive encoding parameters.

14. A non-transitory computer readable medium storing a storing instructions, the instructions comprising: one or more instructions that, when executed by one or more processors of a device for adaptive neural image compression by meta-learning, cause the one or more processors to:
generate a substitute input image and a substitute target quality control parameter using an original input image and an original target quality control parameter, wherein the substitute input image is a modified version of the original input image and the substitute target quality control parameter is a modified version of the original target quality control parameter; and
encode the substitute input image, based on the substitute input image and the substitute target quality control parameter, using an encoding neural network, to generate a compressed representation of the substitute input image, wherein the encoding comprises:
generating a first combined output based on a first combination of a first shared encoding performed on the substitute input image using first shared encoding parameters and a first adaptive encoding performed on the substitute input image using first adaptive encoding parameters; and
generating a second combined output based on a second combination of a second shared encoding performed on the first combined output using second shared encoding parameters and a second adaptive encoding performed on the first combined output using second adaptive encoding parameters.

15. The non-transitory computer readable medium of claim 14, wherein the generating the substitute input image comprises, for each of a plurality of iterations:
computing an overall rate-distortion loss using the original target quality control parameter;
computing a gradient of the overall rate-distortion loss using backpropagation; and
updating the substitute input image and the substitute target quality control parameter based on the gradient of the overall rate-distortion loss.

16. The non-transitory computer readable medium of claim 14, wherein the one or more instructions further cause the one or more processors to generate a compressed bitstream based on the compressed representation of the substitute input image using quantization and entropy encoding.

17. The non-transitory computer readable medium of claim 14, wherein the one or more instructions further cause the one or more processors to:
receive a recovered compressed bitstream and the substitute target quality control parameter;
generate a recovered compressed representation, based on the recovered compressed bitstream and the received substitute target quality control parameter using dequantization and entropy decoding; and
decode the generated recovered compressed representation based on the received substitute target quality control parameter using a decoding neural network to reconstruct an output image.

* * * * *